United States Patent [19]

Knapp et al.

[11] Patent Number: 4,530,883

[45] Date of Patent: Jul. 23, 1985

[54] COMPLEMENTARY COLOR HIGH PRESSURE DECORATIVE LAMINATE

[75] Inventors: Larry I. Knapp, Cincinnati, Ohio; Terry P. Drees, Fort Wright, Ky.

[73] Assignee: Formica Corporation, Wayne, N.J.

[21] Appl. No.: 650,559

[22] Filed: Sep. 13, 1984

Related U.S. Application Data

[63] Continuation of Ser. No. 461,762, Jan. 28, 1983, abandoned.

[51] Int. Cl.$^3$ .................... B32B 27/08; B32B 27/42
[52] U.S. Cl. ............................ 428/503; 428/530; 428/531; 525/515; 525/521; 156/335

[58] Field of Search ............ 428/503, 530, 531; 525/515, 521

[56] References Cited

U.S. PATENT DOCUMENTS 2,545,559  3/1951  Schrimpe ..................... 525/521
4,128,696  12/1978 Goebel et al. ............. 428/531 X Primary Examiner—Patricia C. Ives
Attorney, Agent, or Firm—Frank M. Van Riet

[57] ABSTRACT

Polymethylol ketones are disclosed as ingredients in various resins which find use as the resin component of heat and pressure consolidated laminates, especially decorative laminates having a core of a color complementing that of the decor sheet.

8 Claims, No Drawings

COMPLEMENTARY COLOR HIGH PRESSURE DECORATIVE LAMINATE

This application is a continuation of application Ser. No. 461,762, filed Jan. 28, 1983, now abandoned.

BACKGROUND OF THE INVENTION

Heat and pressure consolidated laminates are generally produced utilizing a core material comprising a plurality of phenolic resin impregnated paper sheets, a decor sheet impregnated with a melamine-formaldehyde resin and, optionally, a melamine-formaldehyde resin impregnated overlay sheet. These laminates have found world-wide success as construction materials, that is, wall panels, counter tops, and so forth, in the home and office. They can be prepared so as to function in a variety of service applications and can be produced with surfaces of high gloss, a matte finish or an embossed finish. They can be rendered post-formable with the application of heat and can be cut or worked much in the same manner as other building materials.

Although the above-described laminates have found a high degree of success over the past forty years, there is a continual need to improve the laminates and/or the method of preparation and, accordingly, research is always on the lookout for means to achieve such improvements.

One of the properties of heat and pressure consolidated laminates for which an ongoing search for improvement is continually being conducted is the elimination of the dark edge line present in all laminates containing cores produced from phenolic resins.

The dark edge line that is perceptible when conventional laminates are cut or worked has been a particularly difficult problem. If the resin impregnated into the core sheets is a phenolic resin a photo-darkening takes place upon exposure to light, resulting in the undesirable edge line. Even if a water-white phenolic resin is employed as the core resin, a photo-darkening of the exposed edge will take place with time. If a water-clear, melamine/formaldehyde resin which is not modified in accordance with the present invention, is used to replace the phenolic resin, laminates made therefrom do not meet the required NEMA standard properties for high pressure decorative laminate.

Accordingly, a long felt need would be satisfied if the dark edge line of decorative laminates could be improved, i.e. could be matched with the color of the decor sheet or be of a color of the designer's choice.

SUMMARY OF THE INVENTION

The use of a melamine-formaldehyde resin containing a polymethylol ketone as an ingredient thereof in the core sheets of the decorative laminates enables the production of a laminate with a solid color edge complementing the color of the decor surface, including white and various pastel colors. The use of the polymethylol ketone modified melamine-formaldehyde resin system results in laminates exhibiting toughness, dimensional stability, impact resistance, and so forth, which meet NEMA standards for high pressure decorative laminates that are produced with phenolic resin impregnated core sheets. When the core papers are pigmented, preferably the same color as the decor sheet, a colored core (including one of a pastel shade) can be obtained, which core is fade resistant when exposed to UV radiation, artificial or natural.

DESCRIPTION OF THE INVENTION INCLUDING PREFERRED EMBODIMENTS

The use of polymethylol ketones having Formula (I), below:

$$C_xH_{2x-y}O \cdot (CH_2OH)_y \qquad (I)$$

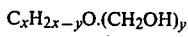

wherein X is an integer from 3 to 6 inclusive, and y is an integer of from 1–6 inclusive, enables the replacement of the phenol-formaldehyde resins normally used in the production of decorative laminates and the corresponding dark edge attributable thereto.

The polymethylol ketones of Formula (I), above, comprise the reaction product of 1–6 moles of formaldehyde with a ketone having the structure $C_xH_{2x}O$, wherein x is as described above.

A preferred group of ketones useful herein are those where x is 3. i.e. the acetone reaction products wherein from 1–6 of the available hydrogen atoms thereof are substituted with aldehyde groups resulting from the reaction thereof with formaldehyde. An even more preferred material is that produced from acetone and four moles of formaldehyde.

The polymethylol ketones which are useful in the present invention are prepared, in general as mentioned above, by the reaction of a ketone, having from 1 to 6 hydrogen atoms attached to the α-carbon atom thereof, with formaldehyde or a formaldehyde generator or donor, in an aqueous system at a pH value below about 10 and in the presence of a tertiary amine catalyst. More specifically, they are more often the reaction products of acetone, which has 6 replaceable hydrogen atoms, with formaldehyde. The preparation of the polymethylol ketones is described in UK Patent Publication GB No. 2,077,256A to Clark Chemical Corporation, which publication is hereby incorporated herein by reference.

Illustrative examples of the polymethylol ketones which may be used in combination with the melamine-formaldehyde resins in accordance with the present invention, include dimethylol acetone, 1,1,1-trimethylol acetone, 1,1,3-trimethylol acetone, sym. tertamethylol acetone, 1,1,1,3-tetramethylol acetone, pentamethylol acetone, hexamethylol acetone, and the like. Although acetone is the most readily available ketone, it will be recognized that other ketones, such as methyl ethyl ketone etc. may be used. Similarly, it will be recognized that although aqueous solutions of formaldehyde or paraformaldehyde may be used most conveniently, other sources of formaldehyde, such as formaldehyde donors or generators, e.g. paraformaldehyde may also be used.

For the purposes of the present invention as set forth above, tetramethylol acetone:

$$(C_3H_6O \cdot CH_2O)_4$$

is a preferred ingredient. It is prepared in accordance with the procedure described in Example 1 of the aforementioned British publication.

The compositions useful in the production of the laminates of the present invention comprise a blend of (1) a polymethylol ketone represented by Formula (I), above, and (2) a melamine-formaldehyde resin. The blend will contain from about 10% to 50% of the polymethylol ketone preferably about 20% to 40%, and most preferably about 20% to 30% by weight, based on the total weight of the blend. The resin blend, as used, is a liquid having a total solids content, in a solvent such as water, of about 30% to 70%, by weight.

The melamine-formaldehyde resin with which the polymethylol ketone is blended is a conventional, well-known resin having a ratio of melamine to formaldehyde of from about 1:1 to about 1:4, respectively. The melamine-formaldehyde resin may be wholly or partially etherified with a lower alkanol, for example methanol.

A preferred blend of melamine-formaldehyde resin and polymethylol ketone is a 45% solids, aqueous resin mixture comprising 75% melamine-formaldehyde resin and 25% tetramethylol acetone, having a pH value in the range 9.5–9.9 and a viscosity of about 35 cps at 25° C.

The blends of the melamine-formaldehyde resin and the polymethylol ketone may be used to impregnate the cellulosic paper sheets of the present invention in an amount ranging from about 25% to about 60%, by weight, based on the weight of the impregnated sheet.

The above resin compositions are used to impregnate cellulosic paper sheets and the sheets are then employed as the core in the production of laminates, the resin blend replacing the phenolic resin conventionally used in the core sheets of the decorative laminates.

The core layer of such laminates is usually made up of a plurality of paper sheets, that is, 2–12 or more, such sheets, which are conventionally impregnated with a phenolic resin as discussed above. It is the phenolic resin which imparts to the laminate the dark edge line observed at the laminate's edge when the laminate is trimmed to size or cut for use. The core sheets are usually constructed of kraft paper, which can be extensible or non-extensible or used as a combination of such sheets. The kraft sheets can be unbleached kraft, bleached kraft, pigmented kraft, pigmented bleached kraft, and so forth; sheets produced from other known pulp furnishings i.e. cotton, rayon, etc. may also be used in the formation of laminates in accordance with the present invention.

When the phenolic resin in the core sheets is replaced by the polymethylol ketone/melamine-formaldehyde resin blend in accordance with the present invention and the core sheets are pigmented in a color so as to conform to the color of the decorative sheet, the dark edge line or band appearing on the edges of conventional laminates is eliminated. When the laminates are cut or trimmed to size, the cut laminate edge appears of a color complementary to the color of the laminate surface resulting from the decor sheet, and, as such articles of manufacture can be produced with no need to chamfer or miter the edges thereof to hide the dark edge line. The properties of the resultant laminates meet accepted and required NEMA standards. Furthermore, the cut edge of such laminates, when exposed to ultraviolet radiation including direct sunlight, will not appreciably change color, thus retaining, on long term exposure, the initial and intended color of the core, which color may be the same as that of the surface or any other color desired. When exact matches to the surface color are required, the core sheets may be paper comprised of the same cellulosic furnish and pigments as the decor sheet and, as necessary, contain a high amount of alpha-cellulose.

The following examples are set forth for purposes of illustration only and are not to be construed as limitations on the present invention except as set forth in the appended claims. All parts and percentages are by weight unless otherwise specified.

EXAMPLE A

To a suitable reaction vessel are added 435 parts (7.5 moles) of acetone, 2432 parts (30 moles) of 37% aqueous formaldehyde, and 0.25 mole of triethylamine. The resulting solution is stirred, heated to 50° C. and held at 50° C. for one hour. A further 0.5 mole of triethylamine is added and the mixture is refluxed at atmospheric pressure for 45 minutes and then cooled to room temperature. The resulting product has a solids content of 53%, a viscosity of 32 cps and a pH of 8.75. The solid product, tetramethylol acetone, contains 2% unreacted formaldehyde and has a sp. gr. of 1.1340.

EXAMPLE B

The tetramethylol acetone product produced in Example A (800 parts, 53% solids) is mixed with 2400 parts of a 42% solids commercially available melamine-formaldehyde resin to give a composition containing 75%, by weight, of melamine-formaldehyde resin and 25%, by weight, of tetramethylol acetone. The solids content of the mixture is 45%.

EXAMPLE 1

A decorative laminate is produced from a melamine-formaldehyde resin impregnated, white pigmented decor sheet and seven white pigmented 158 g./square meter kraft paper sheets impregnated with the resin blend of Example B to produce a laminate 1.3 mm thick. The resultant laminate meets all NEMA specifications for high pressure decorative laminates. The edge of the laminate, when trimmed or cut, is white and reveals no dark band. Exposure of the edge to a fadeometer in accordance with the NEMA Standard light resistance test does not result in any noticeable color change.

Details of the laminate manufacture are as follows:

The resin impregnated sheets are formed into an assembly comprising an upwardly facing decor sheet, seven core sheets, a separator sheet, and a repeat of the above facing downwardly for insertion between metal press plates. Release sheets are placed between the decor surface and the press plate. Several of these assemblies are placed between the platens of a laminating press. The press is closed and pressure is applied as heating is started. Pressure will be at least 3.45 MPa on the surface of the laminate and preferably about 9.67 MPa. The platens of the press are heated to about 125° C. in approximately 25 minutes, held at about 125° C. for approximately 26 minutes and then cooled to below 100° C. while pressure is maintained. The press is opened at the completion of this cycle, the assembly removed from the press and the now cured sheets of laminates removed from between the metal press plates. Release sheets are removed and any uncured flash cut away from around the periphery of the laminate. The backside of the laminate is, optionally but usually, lightly sanded to promote adhesion of the laminate sheet to substrates in the manufacture of articles surfaced with high pressure laminates.

EXAMPLE 2

The procedure of Example 1 is again followed except that a sheet at the back of the core, and becoming part of the core, is used to replace one of the core sheets. This sheet is an exact duplicate of the decor sheet and is impregnated with the same resin as the decor sheet. The resultant laminate exhibits excellent properties and passes the NEMA light resistance test referred to in Example 1.

EXAMPLES 3-10

The procedure of Example 2 is again followed except that the tetramethylolacetone of Example A is replaced by other polymethylol ketones as set forth in Table I, below. In each instance, the laminates passed all NEMA specifications including the light resistance test and exhibited an edge color substantially matching that of the decor surface.

TABLE I

| Example | Polymethylol ketone | |
|---|---|---|
| | x* | y* |
| 3 | 3 | 2 |
| 4 | 3 | 3 |
| 5 | 3 | 6 |
| 6 | 4 | 4 |
| 7 | 4 | 3 |
| 8 | 5 | 5 |
| 9 | 6 | 4 |
| 10 | 3 | 1 |

*as designated in Formula (I)

We claim:

1. A cellulosic paper sheet having impregnated therein from about 25% to about 60%, by weight, based on the weight of the impregnated paper, of a composition of matter comprising a blend of (1) a melamine-formaldehyde resin, wherein the molar ratio of melamine to formaldehyde is in the range of from about 1:1 to about 1:4 and (2) a polymethylol ketone represented by the formula:

$$C_xH_{2x-y}O.(CH_2OH)_y$$

wherein x is an integer from 3 to 6, inclusive, y is an integer of from 1-6, inclusive, said blend containing from about 10% to 50%, by weight, of said polymethylolketone.

2. A heat and pressure consolidated laminate comprising:
   (1) a core comprising a plurality of resin impregnated paper sheets,
   (2) a decor sheet and, optionally,
   (3) an overlay sheet
wherein said core sheets are impregnated with a composition of matter comprising a blend of (1) a melamine-formaldehyde resin, wherein the molar ratio of melamine to formaldehyde is in the range of from about 1:1 to about 1:4 and (2) a polymethylol ketone represented by the formula:

$$C_xH_{2x-y}O.(CH_2OH)_y$$

wherein x is an integer from 3-6, inclusive, y is an integer of from 1-6, inclusive, said blend containing from about 10% to about 50%, by weight, of said polymethylol ketone.

3. A laminate according to claim 2 wherein said (1) comprises a plurality of kraft paper sheets.

4. A laminate according to claim 2 wherein said (1) comprises a plurality of pigmented cellulose sheets.

5. A paper sheet according to claim 1 wherein said paper is kraft paper.

6. A laminate according to claim 2 wherein said polymethylolketone is tetramethylol acetone.

7. A laminate according to claim 2 wherein said decor sheets and said core sheets are pigmented in the same color.

8. A laminate according to claim 2 wherein said decor sheet is pigmented in a color different from said core sheets.

* * * * *